J. D. MULVEHILL.
INDICATING SIGNAL FOR AUTOMOBILES.
APPLICATION FILED DEC. 17, 1919.

1,374,944.
Patented Apr. 19, 1921.

Inventor
John D. Mulvehill
By
Attorneys

UNITED STATES PATENT OFFICE.

JOHN D. MULVEHILL, OF SEATTLE, WASHINGTON.

INDICATING-SIGNAL FOR AUTOMOBILES.

1,374,944.     Specification of Letters Patent.     Patented Apr. 19, 1921.

Application filed December 17, 1919. Serial No. 345,657.

*To all whom it may concern:*

Be it known that I, JOHN D. MULVEHILL, a citizen of the United States, residing at Seattle, in the county of King and State of Washington, have invented certain new and useful Improvements in Indicating-Signals for Automobiles, of which the following is a specification.

This invention relates to automobile signals and more particularly to that type of signals which provide combined visual and sounding means for indicating the direction of a turn or when a stop is to be made.

An object of my invention is to provide a manually operated signal which will indicate equally as well at night as by day, whenever a turn or stop is to be made.

Another object is to provide a suitable signal for an automobile which will be both visual and audible, and also easy to operate and inexpensive to manufacture.

Other objects will appear as the description proceeds.

In the accompanying drawings which form a part of my specification.

Like reference numerals represent like parts throughout the following specification.

Figure 1:
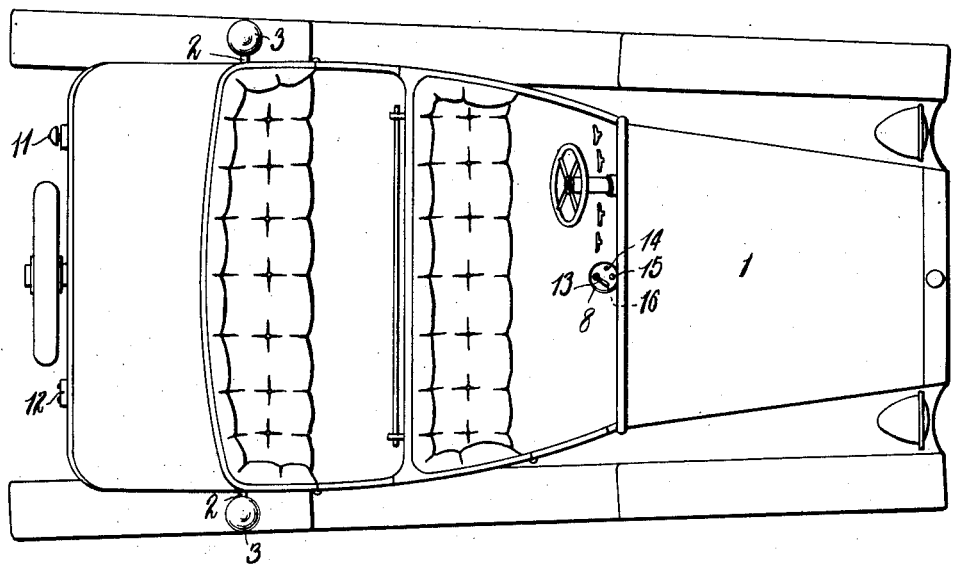
Figure 1 is a plan view of an automobile with my improved signals in position.
Figure 2:
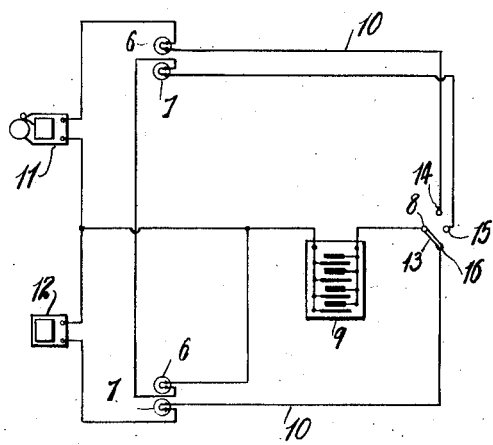
Fig. 2 is a diagram of the wiring of the circuits.
Figure 3:
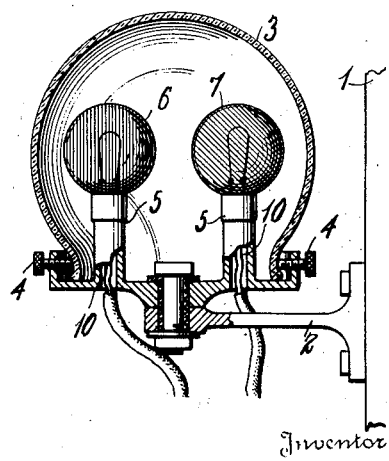
Fig. 3 is a side elevation, partly broken away, showing the two lamps and their supporting means.

At each side of the automobile body 1 and near the rear thereof are positioned a pair of supporting brackets or members 2 which support transparent globes 3, which are removably mounted thereon and held in place by suitable means, such as by set screws 4.

A pair of sockets 5 are attached to each of said supporting brackets 2, for the reception of red and green bulbs 6 and 7, respectively. These lamps or bulbs are connected in circuit with a suitable switch 8 and storage battery 9, by means of electric wire or cable 10. A bell 11 and buzzer 12 are also connected in circuit with the red bulbs 6, so that when a left turn is to be made, the red light on the left side of the automobile and the bell 11 will operate. Likewise, when a right turn is to be made, the red light on the right side of the automobile, and the buzzer 12 will operate. When a stop is to be made, the switch 8 is thrown to middle point, thus lighting the green bulbs 7 on both sides of the automobile. It will be seen that the signals will indicate equally as well at night as by day, as there are both visual and audible signals.

The switch 8 has a manually operated switch arm 13, which contacts with the points 14, 15 and 16, which indicate a turn to the left, a stop, and a turn to the right, respectively.

The wiring of the circuits, is such that should a bulb burn out, the bell or buzzer would be rendered inoperative, thereby notifying the driver of the automobile of his trouble.

Many minor changes in detail of construction may be resorted to without departure from the spirit of the invention.

Having thus described my invention what I claim as new and desire to secure by Letters Patent of the United States is:

A direction signaling indicator comprising a pair of lamp fixtures, one upon each side of the vehicle, lamps of two different colors one of each color in each fixture and visible from both front and rear of the vehicle, an audible electrically operated signal in series with one of said lamps, an audible electrically operated signal of a nature contrasting with said first mentioned signal in series with the lamp on the opposite side of the vehicle from and of the same color as the lamp in series with which the first mentioned signal is connected, and a switch for selectively operating either lamp of similar color with its coöperating audible signal to indicate the proposed direction of a turn or for operating the two lamps of the other color to indicate a proposed stop.

In testimony whereof I affix my signature in presence of two witnesses.

JOHN D. MULVEHILL.

Witnesses:
D. A. PATTEE,
D. A. SCHAEFFER, Jr.